United States Patent [19]

Tsuyama

[11] 3,967,879
[45] July 6, 1976

[54] SPOKE MOUNTED REFLECTOR

[75] Inventor: Yoshimasa Tsuyama, Osada, Japan

[73] Assignee: Tsuyama Manufacturing Co., Ltd., Japan

[22] Filed: Nov. 1, 1974

[21] Appl. No.: 519,852

[30] Foreign Application Priority Data
July 2, 1974 Japan.......................... 49-78589[U]

[52] U.S. Cl............................... 350/99; 301/37 SA; 350/103
[51] Int. Cl.².......................................... G02B 5/12
[58] Field of Search ................. 350/99, 97, 27, 293, 350/103; 301/37 SA; 49/61

[56] References Cited
UNITED STATES PATENTS

| 2,344,542 | 3/1941 | Fike................................ 301/37 SA |
| 3,659,478 | 3/1970 | Pawsat et al.......................... 350/97 |

Primary Examiner—John K. Corbin
Assistant Examiner—B. Wm. Delos Reyes
Attorney, Agent, or Firm—Seymour Rothstein

[57] ABSTRACT

A spoke-mounted reflector assembly for a bicycle or like vehicle comprised of a pair of side reflectors having cooperating interengaging convex and concave portions for securing the two side reflectors to one another in desired position on the spokes of a bicycle.

9 Claims, 7 Drawing Figures

SPOKE MOUNTED REFLECTOR

BACKGROUND OF THE INVENTION

This invention relates to a spoke-mounted reflector for a bicycle or the like.

In the past reflectors have been mounted on various parts of a bicycle or like wheeled vehicle for both safety and attractiveness. More recently, it has been proposed that reflectors be mounted on the rotating wheels to give the reflectors a large spatial movement during rotation of the wheel and thus, to enhance the visibility of the reflectors during use of the bicycle. One method of attaching a reflector to the spokes of a bicycle has been by means of clamps on a mainhousing that are screwed to respective spokes. Another type of spoke-mounted reflector has included locking tabs formed on the reflector housing which tabs interengaged with the spokes. An example of this latter type of spoke-mounted reflector may be found in Linder U.S. Pat. No. 3,781,082. Such mounts would sometimes slip and move or become dislodged from the spokes in use.

An object of the present invention is to provide an improved spoke-mounted reflector which can be mounted in a quick, reliable and long lasting fashion on the spokes of a bicycle wheel.

Another object of the present invention is to provide an improved spoke-mounted reflector incorporating a pair of side members having cooperating interengaging parts for securing the side members in locking engagement with one another and securing the reflector in position on the spokes.

Yet another object of the present invention is to provide an improved spoke-mounted reflector that is relatively inexpensive to manufacture and that is readily mounted onto the spokes of a bicycle or like vehicle in a positive fashion to enhance the safety of the rider. Other objects and advantages of the present invention will become more apparent hereinafter.

BRIEF DESCRIPTION OF THE DRAWING

There is shown in the attached drawing a presently preferred embodiment of the present invention wherein.

DETAILED DESCRIPTION OF THE PRESENT INVENTION

The present invention relates to a spoke-mounted reflector for bicycles or the like. The reflector comprises a pair of side members or supports secured one to the other and operatively affixed on the spokes of the wheel of a bicycle or the like, whereby during rotation of the wheels, the reflectors moving spatially can be readily seen by drivers of vehicles or pedestrians. The reflector is provided on each side with a wide angle reflective surface and thus can be seen from either side of the bicycle over a relatively long distance. The reflective surfaces may be clear or colored, e.g., red and amber, as desired.

Figure 1:
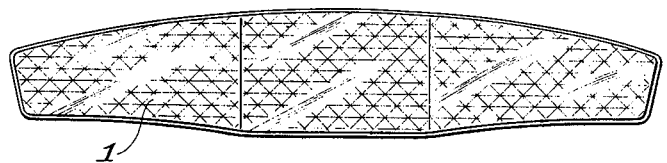
FIG. 1 is a top view of a spoke-mounted reflector made in accordance with the present invention.

Referring to FIG. 1 there is illustrated a preferred embodiment of the present invention. The reflector is comprised of a pair of side reflector means adapted to be secured one to the other. The side reflector shown in FIG. 1 includes a reflective surface 1 made from a synthetic resin such as acrylonitrile plastic. The reflective surface 1 may be formed in three separate zones, each adapted to reflect the light in a different direction so as to provide for a wide angle of reflection. The reflective surface 1 is of a type known in the art and further detailed description is not necessary as the specific reflective surface forms no part of the present invention. The reflective surface will be of a type that complies with Federal and State bicycle safety regulations.

Figure 2A:
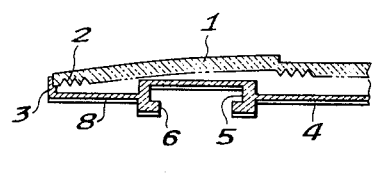
FIG. 2a is a fragmentary longitudinal elevation view in section of one side member of the reflector of FIG. 1.
Figure 2B:
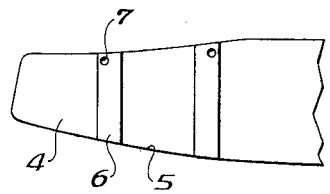
FIG. 2b is a bottom view of the side member of FIG. 2a, with part broken away.

Turning now to FIGS. 2a and 2b there is illustrated constructional details of one side reflector means. The marginal end edge of the reflective surface 1 is fitted on and sealed by suitable means, as for example, ultrasonically, with an upright marginal rim 3, which is formed integrally with a ride support member 4 made from a synthetic material, as for example, ABS resin. The internal face 2 of the reflective surface 1 is faceted and transparent. Provided on the side support member 4 are two spaced apart portions 5 (only one shown), that are concave when viewed in section. The concave portions 5 are formed adjacent the lengthwise ends of the reflector symetrically to the center of the reflector.

Extending from the side extremities of the concave portion 5 are inwardly opposed hook projection rails 6. The opposed surfaces of the projection rail 6 are also inclined in the same manner as the side projection extremities of concave portion 5. The surface or outer face of the support member 4 between the side extremities of the concave portion 5 is inclined outwardly relative to a plane extending longitudinally through the support member 4. The outer face between the side extremities may be smooth or ridged transversely along its length. A mortise or cavity 7 is bored or otherwise formed on the outer surface of the hook portion rails 6. The outer face 8 of the support member 4 (excluding the concave portions 5) lies in an inclined plane parallel to the inclined plane of the outer face between the side extremities of the concave portion 5.

Figure 3A:
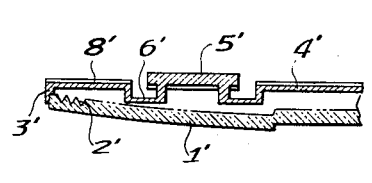
FIG. 3a is a fragmentary longitudinal elevation view in section of the other side member of the reflector of FIG. 1.
Figure 3B:
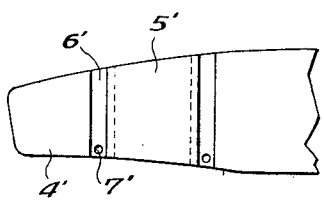
FIG. 3b is a bottom view of the side member of FIG. 3a, with part broken away.

Like numerals denote like parts in the different views and the elements of one side member are indicated with prime numbers corresponding to the like parts of the other side member. With reference to FIGS. 3a and 3b, it is noted that the outer face 8' of the side member 4' is complementary to the outer face 8 of the side member 4 and the outer faces are adapted to abut one another (or to be in close relationship) when in assembled position on the spokes of the bicycle wheel in use.

As seen in FIGS. 3a and 3b, the side support member 4' includes two spaced apart convex portions 5' (only one shown), on the outer face 8' thereof. The concave portion 5 on the side member 4 and the convex portion 5' on the side member 4' comprise interengaging track and channel means. The track means is defined by channels or recesses 6' at each side of the convex portion 5'. Channels or recesses 6' are adapted to receive the hook projection rails 6 of the concave portions 5 of the side support member 4. The outer face of the convex portion 5' lies in an inwardly inclined plane, as does the outer face of channels 6' so that the corresponding components 6, 6' and 5, 5' will be in oblique abutment with one another. Essentially, the inclined planes form complementary angles.

Tenons or protrusions 7' are provided on the bottom faces of the channels 6' and are adapted to be received in the mortices or cavities 7 on the face of the hook projection rails 6 when the side support members 4, 4' are in assembled relationship so as to help hold the side support members together.

The outer face 8' of support member 4' (excluding convex portions 5' and associated channels 6') has an outwardly inclined plane adapted to be in abutment with the oppositely inclined outer face 8 of side support member 4.

The side support members 4 will be assembled to form the reflector by sliding the convex portions 5' into the complementary concave portions 5 so as to firmly engage the rails 6 in channels 6'. At this time the hook projection rails 6 are in close abutment with the channels 6' in an obliquely opposite relationship. Also, the tenon 7' and mortise 7 are engaged with one another to retain the parts in assembled relationship.

Figure 4:
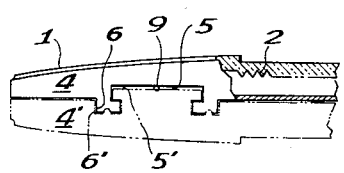
FIG. 4 is a cross section of the reflector of FIG. 1 illustrating the two side members in assembled relationship with parts broken away.

Turning to FIG. 4 there is illustrated a partial view, partly in section, of one of the reflectors of the present invention mounted on a spoke 9 of a bicycle wheel. With the side members 4 and 4' in interengaged relationship, a spoke 9 may be clamped between the opposed outer faces between the interengaging track and channel means 5, 5'. The hook projection rails 6 and the channels 6' are closely abutted with one another in an obliquely opposite relationship. The tenon 7' and the mortise 7 are fixedly fitted one within the other so as to help hold the side support member 4, 4' together. In this manner, spoke 9 will be clamped into a slight gap between the opposite and obliquely facing concave and convex portions 5, 5'.

Figure 5:
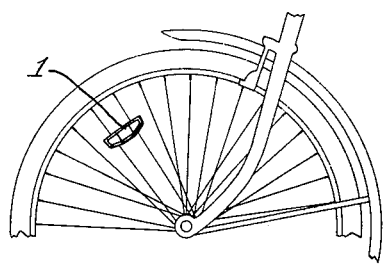
FIG. 5 is a side view of a portion of a bicycle illustrating the spoke-mounted reflector of the present invention mounted on the bicycle wheel spokes.

The present reflector comprised of first and second side reflector means can be safely mounted on two spokes 9 (one spoke only shown in FIG. 4), as shown in FIG. 5. Since the support members 4, 4' are formed from plastic materials having some inherent flexibility, the spokes, generally made from metal, will exert an outward force against the outer faces of the cooperating interengaging means 5, 5' that will tend to retain the reflector in the desired attached position without movement during rotation of the wheels. The inclined planes function as wedges to better grip the spoke.

It will be understood that the two halves or side reflector means may each be separately manufactured of two pieces, a housing and reflective surface. The two halves are assembled by disposing each on opposite sides of the spokes, with one spoke 9 aligned within each concave portion 5 of a side support member 4. The side support member 4' is then engaged with the cooperating side member 4 by aligning the track and channel means or concave and convex means 5, 5' and then sliding the two side support members one with respect to the other until the tenon 7' aligns with the mortise 7, at which point the members 4, 4' will be retained in assembled relationship on the spokes.

The tenon 7' and mortise 7 form means for retaining the side support members in assembled relation. Other like means will be apparent to persons skilled in the art. For example, a projection or step could be provided at the ends of channels 6' to limit the movement of rails 6 relative to the channels 6' and the tenon and mortise could be located other than as illustrated, e.g., an elongated tenon could be formed on one support member between the concave portions and engaged in an elongated mortise of complementary configuration formed between the convex portions of the other support member.

The outer faces of the side support members 4, 4' could be formed planar and parallel to one another and to a longitudinal plane through the reflector, except for the cooperating oppositely disposed outer face portions on the interengaging means, namely the outer face of convex portion 5' and the outer face between the side extremities of the concave portion 5. The inclined planes form complementary angles and are adapted to abut one another or be closely spaced one from the other. The spacing or gaps would be slight — less than the diameter of a spoke to be engaged therebetween. The surface of the inclined plane could be ridged or roughened to enhance non-slip engagement with the spoke.

The reflective surface 1 may be of a type known in the art which complies with current Consumer Product Safety Commission regulations or with other required standards for reflex reflective surfaces, as is known to those skilled in the art. As shown, the reflector of the present invention may have a reflecting surface 1 with three zones, a generally planar central zone and an outer zone having surface angles relative thereto. The exterior of the reflecting surface may be flat or curved as desired and the internal face may be faceted with cubic or triple reflectors of a type known in the art.

The reflector of the present invention is relatively inexpensive to manufacture and can be readily assembled in the field on the spokes of a bicycle without tools or special skills in an expeditious and sturdy manner and without fear of detachment resulting from forces generated during rotation of the wheels. The two side support members comprising the reflector assembly of the present invention are readily mounted upon the spokes of a bicycle or like vehicle by a simple sliding action of one member relative to the other. When assembled the members 4, 4' cooperate with one another and with the spokes to effectively lock the reflector in place and prevent disassembly.

While I have described a presently preferred embodiment of the present invention, it will be understood by those skilled in the art that the invention is not limited thereto since it may be otherwise embodied within the scope of the following claims.

What is claimed is:

1. A spoke-mounted reflector for bicycles or the like comprising first and second side reflector means adapted to be secured to one another, each side reflector means comprising a support having a reflective outer surface the supports of said side reflector means including interengaging track and channel means, said channel means formed on the first support and said track means formed on said second support, said interengaging means including oppositely inclined outer faces, said track means being slidable into engagement with said channel means so as to clamp at least one spoke therebetween when the first and second side reflector means are engaged on a spoked wheel.

2. A spoke-mounted reflector as in claim 1 wherein the outer faces of the track means and second channel means are formed with complementary angles so as to wedge a spoke therebetween when the first and side reflector means are assembled.

3. A spoke-mounted reflector as in claim 1 wherein mortise and tenon means are provided to retain the first and second side reflector means in predetermined assembled relationship.

4. A spoke-mounted reflector as in claim 1, wherein the channel means comprise a pair of rails and concave portions formed on the one support and the track means comprise a convex portion formed on said other support, said convex portion being complementary to said concave portions and being disposed within said concave portions.

5. A spoke-mounted reflector as in claim 1 wherein the inclined outer face on said one support is between the cooperating concave portions on said one support and the inclined outer face on the other support is between the cooperating convex portions on said other support, said channel means receiving said track means with a spoke between said outer faces.

6. A spoke-reflector as in claim 5 wherein the inclined outer faces comprise inclined planes.

7. A spoke-reflector as in claim 6 wherein the inclined planes are provided with transverse ridges extending transverse to the length of channel means and track means.

8. A spoke-reflector as in claim 1 wherein the supports are molded from plastic and the channel means and track means are formed integrally with their respective supports.

9. A spoke-mounted reflector assembly for bicycles or the like comprising one pair of side reflectors, each including a reflective surface having the internal face faceted and a support member integrally connected with a rim sealing said reflective surface with its marginal edge, said support member of one side reflector provided on the surface opposite the reflective surface thereof with two spaced apart concave portions, each having two hook projection rails inwardly opposed to each other, and the support member of the other side reflector provided on the surface opposite its reflective surface with two correspondingly spaced apart convex portions, each having two side channels, the respective outer faces of said concave portions between said hook projection rails having an inclined plane, and the respective outer faces of said convex portions between said channels having an oppositely inclined plane, said respective two different outer faces being in an obliquely opposite arrangement with each other, whereby said side reflectors can clamp two spokes between said concave and convex portions when the pair of side reflectors are slid together into assembled relationship.

* * * * *